US007868487B2

United States Patent
Scharnick et al.

(10) Patent No.: US 7,868,487 B2
(45) Date of Patent: Jan. 11, 2011

(54) APPARATUS AND METHOD FOR RESTRICTING POWER DELIVERY

(75) Inventors: Michael Scharnick, Brookfield, WI (US); Stephen Zbytowski, Oak Creek, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 62 days.

(21) Appl. No.: 11/405,910

(22) Filed: Apr. 18, 2006

(65) Prior Publication Data
US 2007/0244579 A1 Oct. 18, 2007

(51) Int. Cl.
*H02H 11/00* (2006.01)

(52) U.S. Cl. ...................................... 307/326

(58) Field of Classification Search .................. 700/29, 700/79; 307/326
See application file for complete search history.

(56) References Cited

U.S. PATENT DOCUMENTS

| | | | |
|---|---|---|---|
| 3,829,703 A | | 8/1974 | Wilkie |
| 4,697,979 A | | 10/1987 | Nakashima et al. |
| 5,663,713 A | * | 9/1997 | Ironside et al. ............. 340/661 |
| 5,892,299 A | | 4/1999 | Siewert et al. |
| 6,081,752 A | * | 6/2000 | Benson et al. ................ 700/79 |
| 6,549,034 B1 | * | 4/2003 | Pietrzyk et al. ............... 326/38 |
| 6,611,416 B1 | | 8/2003 | Cleereman et al. |
| 6,628,015 B2 | | 9/2003 | Pullmann et al. |
| 6,711,713 B1 | | 3/2004 | Rumpler et al. |
| 6,745,103 B1 | | 6/2004 | McKillop et al. |
| 6,764,059 B2 | | 7/2004 | Cleereman et al. |
| 6,787,940 B2 | * | 9/2004 | Pullmann .................... 307/326 |
| 6,898,468 B2 | * | 5/2005 | Ott et al. ....................... 700/21 |
| 6,937,450 B1 | | 8/2005 | Mayer et al. |
| 6,999,823 B2 | * | 2/2006 | Nishizawa et al. ............ 700/12 |
| 7,149,601 B2 | | 12/2006 | Murakami |
| 7,212,391 B2 | | 5/2007 | Cleereman |
| 7,420,297 B2 | | 9/2008 | Scharnick |

(Continued)

OTHER PUBLICATIONS

Rockwell Automation, "Allen-Bradley: ElectroGuard Safety Isolation System, Bulletin 2030, Bringing Safety Isolation Within Reach", Publication 2030-BR001A-EN-P, Aug. 2003, 12-page bulletin, published in USA.

(Continued)

*Primary Examiner*—Michael Rutland Wallis
(74) *Attorney, Agent, or Firm*—Whyte Hirschboeck Dudek; Alexander R. Kuszewski; John M. Miller

(57) ABSTRACT

An apparatus and method for restricting operation of a power delivery system are disclosed. In at least some embodiments, the apparatus includes a first input terminal at which is received a first command signal, and a second input terminal at which is received an additional signal. The apparatus further includes an output terminal at which is provided a control signal, and a circuit that generates the control signal based at least indirectly upon the first command and additional signals. The control signal generated by the circuit is configured to cause the power delivery system to not deliver at least one type of power when the first command signal indicates a command to do so, if the additional signal indicates an acceptability status. In some embodiments, the power delivery system is an isolation system (e.g., safety isolation system) as are employed in industrial environments, and the apparatus is a permissive module.

42 Claims, 4 Drawing Sheets

U.S. PATENT DOCUMENTS

| | | | |
|---|---|---|---|
| 7,453,677 B2 | 11/2008 | Bucella et al. | |
| 7,562,261 B2 * | 7/2009 | Meyer-Gräfe et al. | 714/48 |
| 2005/0010332 A1 | 1/2005 | Abe et al. | |
| 2006/0290210 A1 * | 12/2006 | Foard | 307/147 |
| 2007/0061019 A1 * | 3/2007 | Scharnick et al. | 700/12 |
| 2007/0085424 A1 | 4/2007 | Scharnick | |
| 2008/0078658 A1 | 4/2008 | Poyner et al. | |
| 2008/0294273 A1 | 11/2008 | Scharnick | |

OTHER PUBLICATIONS

Product literature concerning: ElectroGuard TM Safety Isolation System; printed Jun. 17, 2005; www.ab.com/safety/electroguard/2030_operation.html; 2003 Rockwell International Corporation.

* cited by examiner

APPARATUS AND METHOD FOR RESTRICTING POWER DELIVERY

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to control systems and, more particularly, to systems for controlling power delivery such as isolation systems.

BACKGROUND OF THE INVENTION

There exist currently a wide variety of systems for controlling the delivery of various forms of power. Among these power delivery systems for example are isolation systems that are designed to disconnect, ground and/or otherwise isolate equipment/machines from one or more power sources in a predictable, reliable manner. In some environments, such as industrial environments, more specialized types of isolation systems are often employed not only to control the delivery of power, but also to do so in a manner that reduces the chance that the controlled equipment/machines might be unintentionally restarted at times when they are being accessed by repair personnel or technicians for purposes of repair or modification. The use of such power delivery systems thus enhances the confidence and rapidity with which such personnel can accomplish such repairs/modifications.

Referring to FIG. 1, one Prior Art power delivery system of this type is the ElectroGuard™ Bulletin 2030 Safety Isolation System available from Rockwell Automation, Inc. of Milwaukee, Wis., the beneficial assignee of the present application. This power delivery system, shown in FIG. 1 as an isolation system 2, includes both an electrical power isolation system 4 and a pneumatic (or hydraulic or other fluidic) power isolation system 6, and operates as follows.

When a failure or other condition occurs at a machine 8 of an industrial system 10 (in this case, an assembly line), and an operator appropriately switches or triggers a remote lockout switch (RLS) 12 associated with that machine to an "OFF" position, the isolation system 2 serves to disconnect both electric power and pneumatic power lines 15 and 16, respectively, from the machine so as to decouple the machine from both of those types of power. Additionally, the isolation system 2 then further serves to ground the power wires to the machine 8.

Once the machine 8 has been isolated in this manner, an indication is provided to the operator (e.g., a light 18 turns on) indicating that it is appropriate for the operator to access the machine for purposes of making a repair or some other modification to the machine. Typically the operator will then access the machine by entering into a normally-inaccessible region, e.g., by opening a safety gate 20 and entering into the machine as shown (alternatively, for example, the operator could pass through a safety or safety presence sensing device).

Once the operator has completed the repair or modification and left the normally-inaccessible region, the operator appropriately switches or triggers the RLS 12 again, this time to an "ON" position. After this occurs, the isolation system 2 reestablishes the connections between the power sources and the machine 8. The isolation system 2 typically employs redundant circuitry such as safety relays to enhance the isolation system's reliability in performing its various functions.

Power delivery systems such as the isolation system 2 of FIG. 1 are often operated alongside other control systems that are employed to govern the operation of the controlled equipment/machines. In industrial environments, for example, programmable logic controllers (PLCs) are often employed to monitor and control the operation of the equipment/machines of an industrial system. Thus, as also shown in FIG. 1, the isolation system 2 can operate alongside a PLC 22, with the isolation system governing whether power (of various types) is provided to the machine 8 and the PLC 22 controlling operation of the machine 8 when power is being provided.

Notwithstanding the fact that power delivery systems are commonly employed alongside other control systems in controlling a variety of equipment/machines in industrial and other environments, conventional arrangements of such systems do not necessarily achieve optimal results under all circumstances. Rather, there are circumstances in which the operation of a power delivery system can negatively (however, unintentionally) impact the operation of equipment/machines that are under the control of an affiliated control system, insofar as the operation of the power delivery system undermines or conflicts with the operation of the affiliated control system.

For example, there are circumstances in which a control system is operating a machine to achieve a particular goal, and where an abrupt interruption of power to the machine will impede attainment of that goal. Further for example, with reference again to FIG. 1, if the PLC 22 was controlling the machine 8 to manufacture a given component part, an abrupt interruption of the power being provided to the machine 8 due to operation of the isolation system 2 could result in the cessation of the manufacturing process and possibly result in the creation of a partially-completed part that was neither saleable nor salvageable.

Additionally for example, abrupt interruptions of power (or switching on and off of power) can reduce the operational efficiency of machines such as the machine 8 that are being controlled by a control system such as the PLC 22. Such reductions in efficiency can occur, also for example, because the power interruptions disrupt the timing of the overall manufacturing process, because material or energy is wasted, or for other reasons. In extreme cases, abrupt interruptions of power can potentially even result in damage to machinery.

For at least these reasons, therefore, it would be advantageous if an improved manner of implementing power delivery systems that operate alongside other control systems in relation to controlled equipment/machines could be developed. More particularly, in at least some embodiments, it would be advantageous if an improved manner of implementing an overall system including each of an isolation system, an additional control system, and a controlled machine could be developed. In at least some such embodiments, it further would be advantageous if such overall systems continued to afford high levels of reliability as do many conventional isolation systems and/or control systems.

BRIEF SUMMARY OF THE INVENTION

The present inventors have recognized that, in various circumstances, the operation of a power delivery system such as an isolation system can negatively impact the operation of a machine being controlled by another control system because the operation of the former system counteracts or undermines the operation of the latter system. The present inventors have further recognized that these issues can be alleviated by, in at least some embodiments, coordinating the operation of the isolation system (and/or an additional apparatus or module operating in conjunction therewith) with the operation of the other control system so that the isolation system will not disconnect power unless the other control system provides a signal to the isolation system (or to the additional apparatus or module) indicating that such power disconnection is acceptable.

More particularly, in at least some embodiments, such coordination can be achieved by placing an additional, intermediate or "permissive" module in between the isolation system and both the other control system and the triggering input devices (e.g., switching devices such as remote lockout switches) associated with the isolation system, and configuring the permissive module so that the isolation system only receives a triggering input if the other control system provides a signal indicating that the power disconnection is acceptable. In at least some additional embodiments, all signals within (as well as possibly to and from) such a permissive module are communicated in redundant form, and/or the signal provided from the other control system to the permissive module must meet one or more special criteria in order to suffice as an indication that power disconnection is acceptable.

More particularly, in at least some embodiments, the present invention relates to a system for controlling a delivery of a first power from a power source to a load. The system includes a first power delivery system capable of receiving the first power at a first input port and determining whether the first power is delivered to a first output port. The system further includes a first intermediate module connected with the first power delivery system and configured to receive first and second signals, the first signal representing a command relating to the delivery of the first power and the second signal indicating whether a cessation of the delivery is acceptable to an additional control system. The intermediate module provides a first control signal to the first power delivery system that is configured to cause the cessation of the delivery of the first power to the first output port when the first signal is commanding the cessation, if the second signal indicates that the cessation is acceptable.

Additionally, in at least some embodiments, the present invention relates to an apparatus for restricting operation of a power delivery system. The apparatus includes a first input terminal at which is received a first command signal, and a second input terminal at which is received an additional signal. The apparatus further includes an output terminal at which is provided a control signal, and a circuit that generates the control signal based at least indirectly upon the first command and additional signals. The control signal generated by the circuit is configured to cause the power delivery system to not deliver at least one type of power when the first command signal indicates a command to do so, if the additional signal indicates an acceptability status.

Further, in at least some embodiments, the present invention relates to a method of controlling an operation of a power delivery system. The method includes receiving a first signal indicating a command to cause a change in a power delivery, determining whether a second signal indicating that the change in the power delivery is acceptable also has been received, and providing a control signal intended to cause the change in the power delivery after determining that the second signal has been received.

DETAILED DESCRIPTION OF THE PREFERRED EMBODIMENT

In at least some embodiments, the present invention can include or be part of a "safety system" used to protect human life and limb in an industrial or other environment. Nevertheless, the term "safety" as used herein is not a representation that the present invention will make an industrial or other process safe or that other systems will produce unsafe operation. Safety in an industrial or other process depends on a wide variety of factors outside of the scope of the present invention including, for example: design of the safety system, installation and maintenance of the components of the safety system, and the cooperation and training of individuals using the safety system. Although the present invention is intended to be highly reliable, all physical systems are susceptible to failure and provision must be made for such failure.

Figure 2:
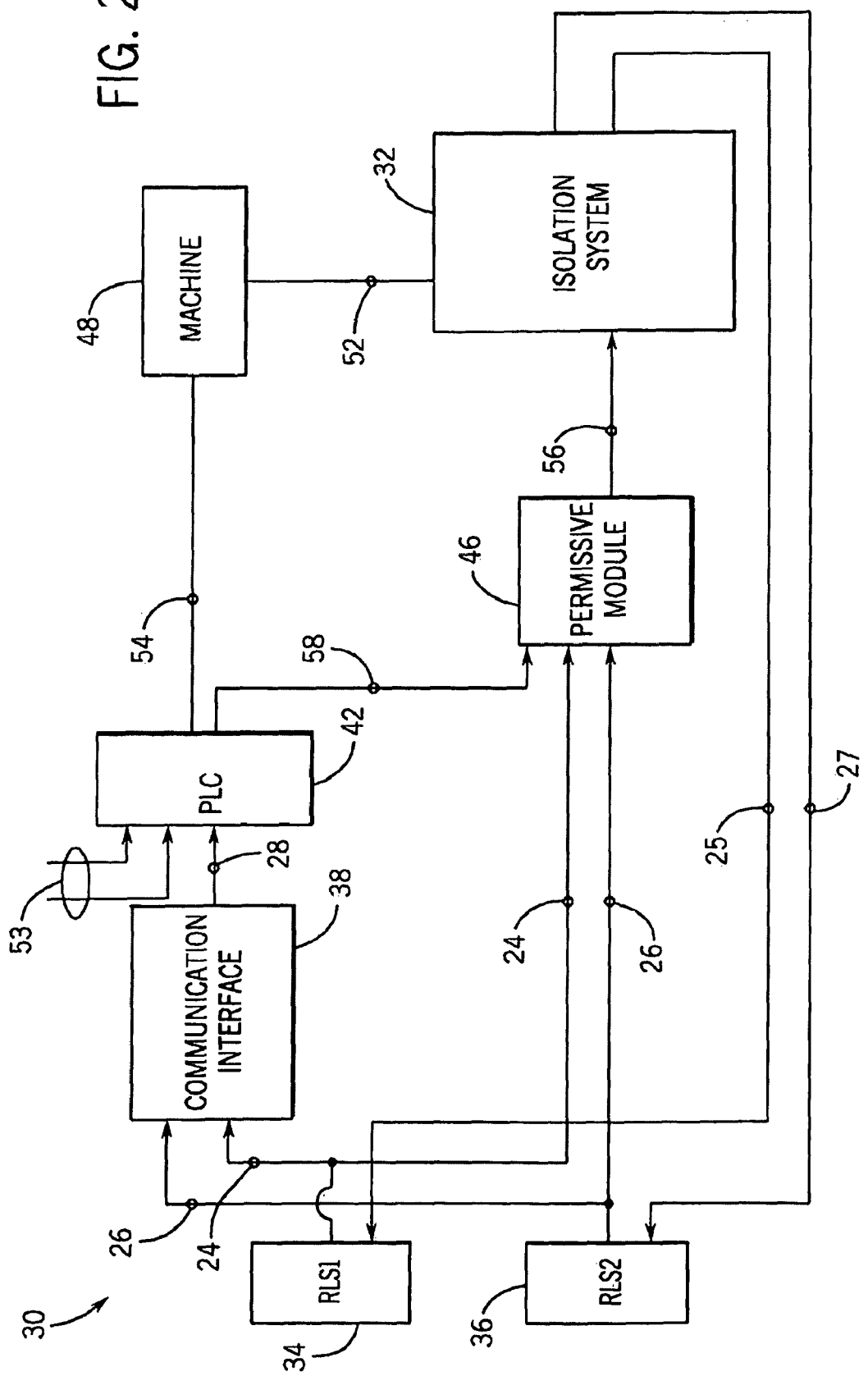
FIG. 2 shows in schematic form an improved version of the industrial system of FIG. 1 having an isolation system, PLC and controlled machine, which in accordance with at least some embodiments of the present invention also employs a permissive module that links the PLC with the isolation system.

Referring to FIG. 2, an improved industrial system 30 is shown that includes an isolation system 32, a programmable logic controller (PLC) 42, and a controlled machine 48. Each of the isolation system 32 and the PLC 42 is independently coupled to the controlled machine 48. The isolation system 32 in particular is coupled to the machine 48 by one or more links 52 and is capable of determining whether power of one or more types is provided to the machine 48 by way of those links or precluded from reaching the machine, such that the machine is isolated. The PLC 42 is in communication with the machine 48 by way of one or more communication links 54 and, by way of those communication links, monitors and/or controls one or more operations of the machine 48. Additionally as shown, the PLC 42 can (and typically does) include one or more additional input terminals (and/or output terminals) 53 for receiving (or providing) process input signals or other signals.

In the present embodiment, the isolation system 32 is an ElectroGuard® Bulletin 2030 Safety Isolation System and the PLC 42 is a GuardPLC™ 1200 programmable logic controller, both of which are available from Rockwell Automation, Inc. of Milwaukee, Wis., the beneficial assignee of the present application. However, the isolation system 32 and the PLC 42 are intended to be representative of a wide variety of types of power delivery systems and other control systems, and the present invention is intended to encompass numerous different types of power delivery systems and other control systems other than the particular isolation system and PLC mentioned above.

For example, while the ElectroGuard® Bulletin 2030 Safety Isolation System is a safety isolation system, the isolation system 32 is also intended to be representative of non-safety isolation systems. Indeed, it is intended that the present invention encompass any isolation system or other type of system that is capable of disconnecting, connecting, decoupling, coupling, grounding, or otherwise determining or controlling the provision of any one or more different types of power to a load including, for example, electric, pneumatic, hydraulic, other fluidic, rotational, thermal, or other types of power.

Likewise, while the GuardPLC™ 1200 PLC is an exemplary PLC, the PLC 42 is also intended to be representative of other PLCs, including both safety and non-safety PLCs. Further, the present invention is also intended to encompass non-PLC control systems and other types of control systems and computerized controllers (e.g., microprocessors), which depending upon the embodiment could take the place of the PLC 42. In at least some embodiments (some of which are described below), one or both of the isolation system 32 and PLC 42 are intended to be representative of (e.g., can be substituted with) multiple systems that are combined or multiplexed with one another, or otherwise function together or in relation with one another. For example, the PLC 42 is also intended to be representative of redundant safety PLCs that employ two (or more) identical controllers/computers that perform identical tasks redundantly in parallel with one another.

Further, the industrial system 30 itself is intended to be representative of a wide variety of systems (e.g., assembly line systems, web handling systems, pump systems, conveyor systems, etc.) employed in manufacturing or other industrial environments or facilities. The machine 48 is intended to be representative of any one or more machines or equipment (or possibly one or more systems involving numerous machines) that can be employed in such environments or facilities. Although the industrial system 30 and the machine 48 of FIG. 2 are intended for use in an industrial environment or facility, the present invention is not limited in its applicability to use in industrial environments or facilities, but rather is also intended for use in connection with other types of systems and/or machines implemented in a variety of other environments and facilities including, for example, facilities that implement various processes and systems such as hospitals, airports (e.g., a baggage handling system), etc.

Further as shown in FIG. 2, the industrial system 30 includes first and second remote lockout switches (RLSs) 34 and 36. As described above with respect to FIG. 1, the RLSs are switching devices that can be triggered or switched by a human operator (or potentially automatically by way of a computer or the like) when the operator wishes to cause the isolation system 32 to disconnect the machine 48 from power (e.g., to isolate the machine). In particular, when an operator switches one or both of the RLSs from an "ON" state to an "OFF" state in order to cause isolation to occur, command signal(s) indicating isolation requests is/are provided by the respective RLSs 34 and 36 onto respective communication links 24 and 26, respectively. The RLSs 34, 36 are intended to be representative of a variety of different triggering input devices, other types of switching devices or other devices for producing appropriate command signals. Further, while two RLSs are shown in FIG. 2, it will be understood that any number of RLSs (or other devices providing command signals) could be employed in any given embodiment (e.g., one, two or many more than two, for example, hundreds).

Figure 1:
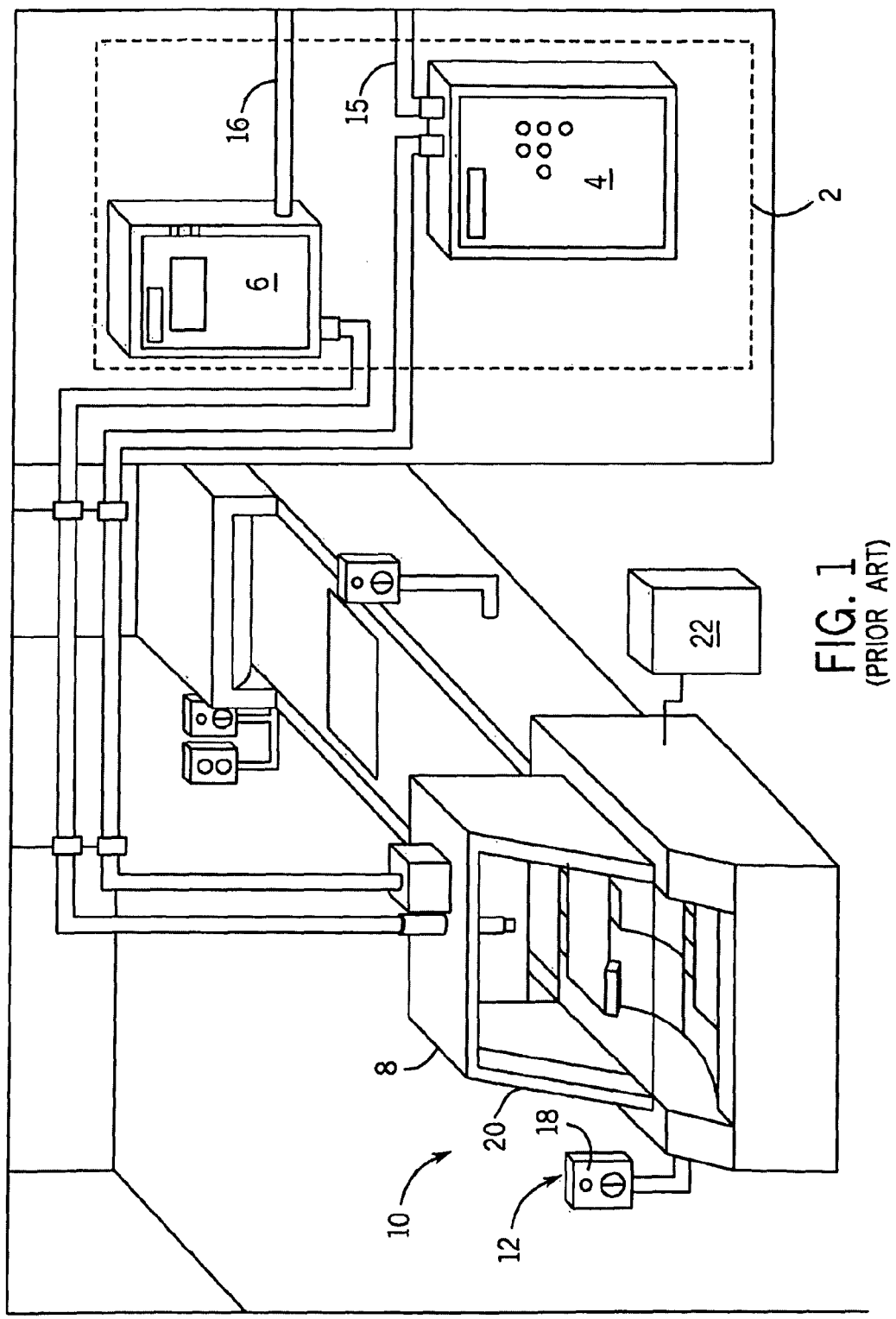
FIG. 1 is a perspective view of an exemplary Prior Art industrial system employing an exemplary isolation system that is capable of isolating a machine from two different sources of power, and also employing a programmable logic controller (PLC) that controls operation of the machine.

In contrast to conventional industrial systems such as the industrial system 10 of FIG. 1, the two RLSs 34 and 36 of the industrial system 30 are not coupled directly to the isolation system 32 but rather are coupled to an additional or intermediate module termed a "permissive module" 46, by way of the respective communication links 24 and 26. The permissive module 46 in turn is coupled with both the isolation system 32 by way of one or more communication links 56 and the PLC 42 by way of one or more communication links 58. As will be described in further detail with respect to FIG. 3, in accordance with at least some embodiments of the present invention the permissive module 46 only relays a command signal provided by one or more of the RLSs 34 and 36 (or provides a further signal based upon such command signal(s)) to the isolation system 46 if an appropriate signal (or signals) is received from the PLC 42.

Further, return signals are also provided from the isolation system 32 to each of the RLSs 34 and 36 by way of two (or more) communication links 25 and 27, respectively. The return signals confirm the operational state of the isolation system 32 and/or the isolation state of the machine 48. Such information can be used for various purposes including, for example, the purpose of providing output signals to operators at the RLSs 34 and 36 (e.g., to cause lights such as the light 18 of FIG. 1 to be switched on or off). In alternate embodiments, the return signals are provided from the isolation system 32 to the permissive module 46, which in turn provides those signals (or other signals based upon those signals) to the RLSs 34, 36.

Additionally, in the present embodiment, the RLSs 34 and 36 are further coupled by way of the respective communication links 24, 26 to a communication interface 38, which in turn is coupled to the PLC 42 by way of an additional communication link 28. The communication interface 38 can take any of a number of forms and can be, for example, an input/output (I/O) terminal or merely a RS232 link (indeed, in some embodiments the interface 38 need not be present, or can along with the link 28 be considered to be part of the PLC). Thus, in at least some embodiments, the PLC 42 is provided (at least indirectly) with the same signals as are provided to the permissive module 46, thus allowing the PLC to be made aware of when an operator has provided a command that the machine 48 be isolated, and allowing the PLC to adjust its operation as necessary.

Figure 3A:
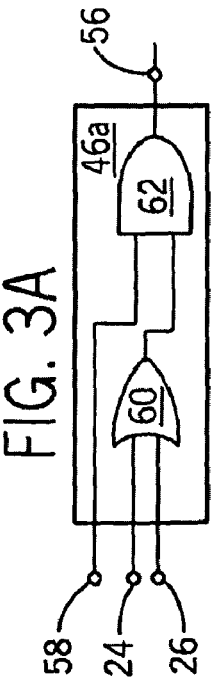
FIGS. 3A and 3B show in schematic form internal components of two exemplary embodiments of the permissive module of FIG. 2.

The permissive module 46 of FIG. 2 can take a variety of forms depending upon the embodiment. In a simple form, as shown in FIG. 3A, the permissive module (shown as permissive module 46a) merely includes an OR gate 60 and an AND gate 62, where the output of the OR gate 60 is fed to one of the input terminals of the AND gate 62. In this embodiment, each of the signals from the RLSs 34 and 36, provided by way of the communication links 24 and 26, respectively, is provided to a respective input terminal of the OR gate 60. The output signal from the PLC 42 provided by way of the communication link 58 is fed to another of the input terminals of the AND gate 62. The output terminal of the AND gate 62 in turn provides the output signal of the permissive signal module 46a, which is provided onto the communication link 56, and which serves as an isolation signal for the isolation system 32. Although the term "isolation signal" is used in connection with this and certain other embodiments described herein, since the signal is being provided to an isolation system and influences the status of that isolation system, it should be understood that the present invention is also intended to encompass permissive modules (and similar devices) that provide control signals and other types of signals to (and also potentially receive various signals from) other types of power delivery systems and other control systems and that do not necessarily relate to isolation.

In the embodiment of FIG. 3A, the permissive module 46a is configured to interact with RLSs that provide a low (e.g., zero) signal when it is intended that the RLS not cause the machine 48 to be isolated (when the RLS is switched "ON"), and provide a high (e.g., one) signal when it is intended that the machine 48 be isolated (when the RLS is switched "OFF"). The permissive module 46a also is configured to interface a PLC that provides a low signal when it is not an appropriate time (from the standpoint of the PLC) to isolate the machine 48, and provides a high signal when it would be acceptable for the machine 48 to be isolated.

Given these assumptions, the permissive module 46a operates as follows. In particular, the isolation signal output onto the communication link 56 by the permissive module 46a is normally a low signal causing the isolation system 32 not to isolate the machine 48 when neither of the RLSs 34 and 36 has been switched to an "OFF" state indicating a request that the machine be isolated, or when the signal provided by the PLC 42 via the communication link 58 is a low signal indicating that it is not an appropriate time for the machine 48 to be isolated. However, if one or both of the RLSs 34 and 36 is switched to the "OFF" state such that a high signal is provided to the OR gate 60 indicating a request that the machine 48 be isolated, then the permissive module 46a outputs a high isolation signal onto the communication link 56 intended to cause the isolation system 32 to isolate the machine 48, so long as the PLC 42 also provides a high signal via the communication link 58 indicating that it is an acceptable time for the machine 48 to be isolated. That is, even if one or both of the RLSs 34 and 36 are switched to the "OFF" state, the permissive module 46a maintains a low isolation signal on the communication link 56 in the event that the PLC 42 is providing a low signal via the communication link 58 indicating that it is an inappropriate time for isolation to occur.

Figure 3B:
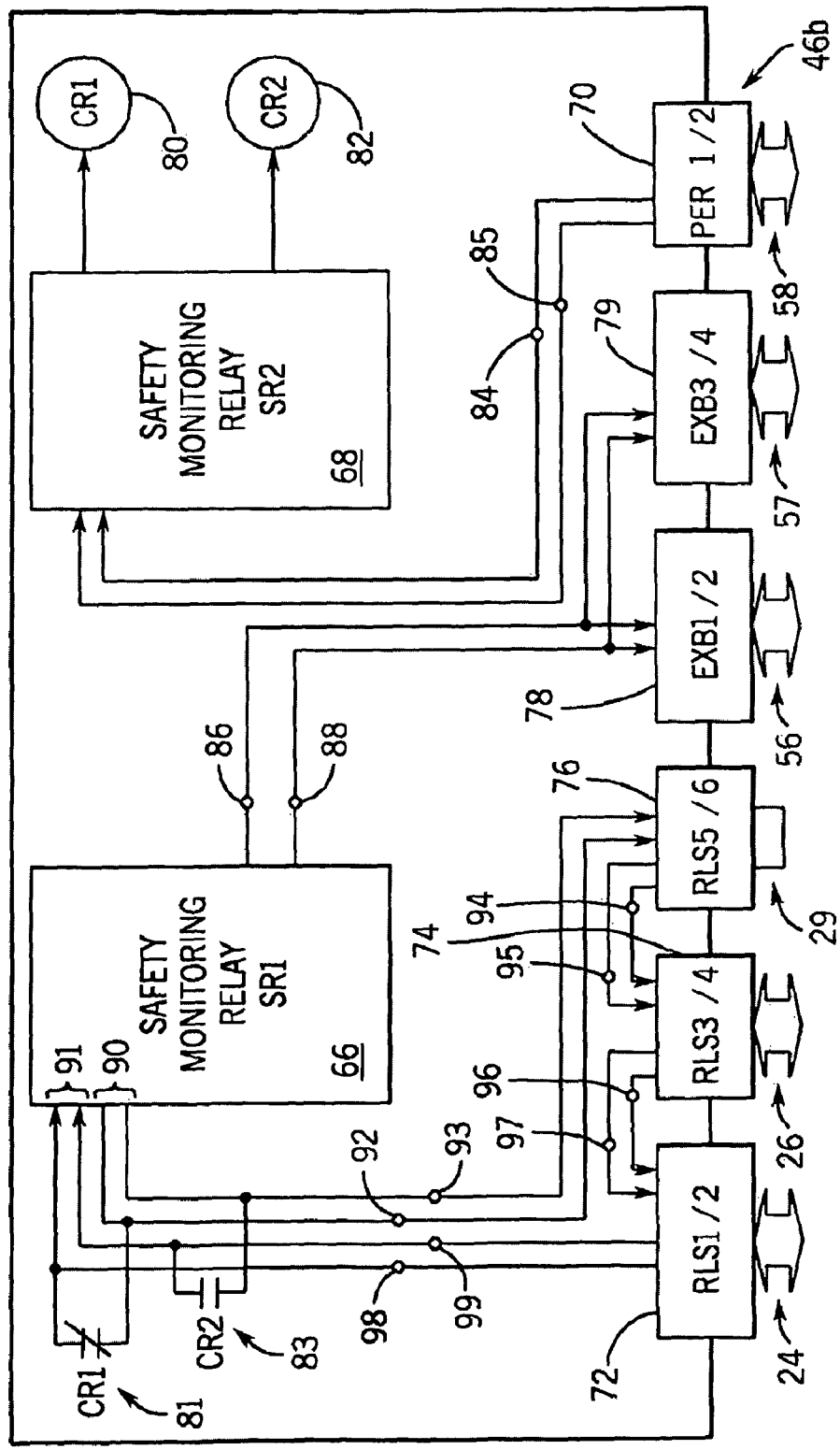

Turning to FIG. 3B, internal components of a second embodiment of the permissive module of FIG. 2, which will be referred to as permissive module 46b, are shown. In contrast to the permissive module 46a of FIG. 3A, the permissive module 46b of FIG. 3B is configured to include significant redundancy in its operation so as to improve the reliability of the permissive module and, in at least some embodiments, achieve similar levels of redundancy and reliability as are provided with respect to the isolation system 32 and the PLC 42. As shown, the permissive module 46b includes first and second safety monitoring relays 66 and 68, respectively. In the present embodiment, the safety monitoring relay 66 is a 440R-N23132 and the safety monitoring relay 68 is a 440R-S07139 available from Rockwell Automation, Inc. of Milwaukee, Wis., the beneficial assignee of the present application. These particular safety monitoring relays are only intended to be exemplary, however, and in other embodiments a variety of other safety relays can also be used.

As shown, the second safety monitoring relay 68 receives first and second redundant input signals by way of first and second communication links 84 and 85 from a first input port 70, which is in communication with the PLC 42 by way of the communication link 58. The second safety monitoring relay 68 is configured to operate such that, in the event that each of the redundant signals provided by way of the communication links 84 and 85 is communicative of a signal from the PLC 42 indicating that it is acceptable for the machine 48 to be isolated, then the safety monitoring relay causes a first coil 80 to be energized and also causes a second coil 82 to become deenergized. Otherwise, if one or both of the signals provided by way of the communication links 84 and 85 is/are representative of a command from the PLC 42 that the machine 48 should not be isolated (e.g., that isolation is not acceptable), then the second safety monitoring relay 68 causes the first coil 80 to be deenergized and the second coil 82 to be energized.

Further as shown in FIG. 3B, second, third and fourth input ports 72, 74 and 76 are respectively connected in series or daisy-chain fashion to the first safety monitoring relay 66. More specifically, the first safety monitoring relay 66 at a pair of output terminals 90 provides first and second redundant output signals respectively on first and second communication links 92 and 93 to the fourth input port 76. The fourth input port 76 in turn is coupled to the third input port 74 by way of two additional communication links 94 and 95, and the third input port 74 in turn is coupled to the second input port 72 by two additional communication links 96 and 97. The second input port 72 then is coupled to two input terminals 91 of the first safety monitoring relay 66 by way of two additional communication links 98 and 99. Also as shown, the second input port 72 is configured to receive a command signal via the communication link 24 from the first RLS 34 and the third input port 74 is configured to receive a signal via the communication link 26 from the second RLS 36. The third input port 76 likewise could, in alternate embodiments, receive an input signal from a RLS; however, in the present embodiment (e.g., that of FIG. 2) in which there are only two RLSs 34 and 36, a jumper 29 is connected to the input port 76.

Additionally as shown, a first, normally-closed contact 81 is coupled between the communication links 92 and 98 while a second, normally-open contact 83 is coupled across the communication links 93 and 99. The contact 81 is controlled by the first coil 80 while the second contact 83 is controlled by the second coil 82. Further as shown, the first safety monitoring relay 66 provides (or is capable of providing) first and second redundant signals 86 and 88 to each of a first output port 78 and a second output port 79. In the present embodiment, it is the first output port 78 that is coupled to the isolation system 32 by way of the communication link 56. However, in alternate embodiments, the output port 79 also could be coupled to the isolation system 32 or to another isolation system or other device by way of a communication link 57.

The permissive module 46b operates as follows. If each of the signals provided by the RLSs 34 and 36 by way of the communication links 24 and 26 are signals representing commands that the machine 48 not be isolated (e.g., the RLSs are in the "ON" state), then the second input port 72 serves to short circuit the communication link 96 with the communication link 98 and the communication link 97 with the communication link 99, and also the third input port 74 serves to short circuit the communication link 94 with the communication link 96 and the communication link 95 with the communication link 97. Given the presence of the jumper 29 (or possibly more than one jumper), the fourth input port 76 also short circuits the communication link 92 with the communication link 94 and the communication link 93 with the communication link 95. Thus, in this circumstance, signals applied to the pair of redundant output terminals 90 of the first safety monitoring relay 66 are communicated to the pair of redundant input terminals 91 of that safety monitoring relay, regardless of the status of the coils 80, 82 and contacts 81, 83. Consequently, the signals output by the first safety monitoring relay 66 on the communication links 86, 88, and the isolation signal provided onto the communication link 56, are configured to cause the isolation system 32 to continue supplying power to the machine 48.

However, if one or both of the input ports 72 and 74 receives a signal from its respective RLS 34 or 36 indicating a command that the isolation system 32 isolate the machine 48, then the respective input port or ports serve to open circuit the pairs of communication links with which the input port(s) is/are in contact. Thus, if such a command signal is provided to the second input port 72, then that input port serves to open circuit the communication link 96 from the communication link 98 and the communication link 97 from the communication link 99. Likewise, if such command signal is provided to the input port 74, then that input port serves to open circuit the communication link 94 from the communication link 96 and the communication link 95 from the communication link 97. Thus, when one or both of the input ports 72 and 74 receive such command signals and produce such open circuiting, the signals provided at the output terminals 90 of the safety monitoring relay 66 are not provided to the input terminals 91 of that safety monitoring relay unless the contacts 81 and 83 serve to respectively connect the communication link 92 with the communication link 98 and the communication link 93 with the communication link 99, respectively. Since the operation of the contacts 81 and 83 is determined by the operation of the second safety monitoring relay 68, which in turn operates based in response to signals reflective of an output of the PLC 42, in this circumstance the output signal from the PLC determines whether the safety monitoring relay 66 does or does not receive the signals provided at output terminals 90 at its input terminals 91.

More particularly, if the PLC 42 provides a signal on the communication link 58 indicating that it is not acceptable for the machine 48 to be isolated, and the signal is relayed by each of the communication links 84 and 85, then the second safety monitoring relay 68 causes the first coil 80 to be deenergized such that the first contact 81 remains a short circuit, and also causes the second coil 82 to become energized such that the second contact 83 becomes a short circuit. Thus, in such circumstance, the first safety monitoring relay 66 receives at its input terminals 91 the signals that are provided at its output terminals 90. In such case, the first safety monitoring relay 66 behaves just as if all of the RLSs 34 and 36 continued to provide signals not commanding isolation of the machine 48. That is, the first safety monitoring relay 66 provides output signals via the communication links 86 and 88 that result in an isolation signal being provided to the isolation system 32, by way of the output port 78 and the communication link 56, that does not cause the isolation system to isolate the machine 48.

Alternatively, if the signal provided by the PLC 42 via the communication link 58 to the first input port 70 is a signal indicating that it is acceptable for the machine 48 to be isolated, and the signal is relayed by each of the communication links 84 and 85, then the second safety monitoring relay 68 causes the first coil 80 to be energized so as to open circuit the first contact 81, and also causes the second coil 82 to become deenergized so as to open circuit the contact 83. In such case, the signals provided at the output terminals 90 of the first safety monitoring relay 66 are no longer provided to its input terminals 91. Consequently, the signals output by the first safety monitoring relay 66 on the communication links 86 and 88, and the isolation signal provided onto the communication link 56, are configured to cause the isolation system 32 to isolate the machine 48.

As is evident from FIG. 3B, in the present embodiment shown, the permissive module 46b is designed for enhanced reliability insofar as it includes redundancy in terms of each of its internal components, including the coils 80 and 82, the contacts 81 and 83, and each of the internal communication links connecting the safety monitoring relays with each of the input ports and output ports 70-79. The safety monitoring relays 66, 68 also are redundant devices in terms of their internal componentry. Further, in the present embodiment the contacts 81 and 83 are of opposite type (e.g., the first contact 81 is normally-closed and the contact 83 is normally-open) and the second safety monitoring relay 68 is configured to always energize the first coil 80 while deenergizing the second coil 82, and visa-versa. Configuration of the permissive module 46b in this manner further enhances reliability since, in the event that either of the contacts 81, 83 becomes welded closed, at least one of the signals provided by one of the output terminals 90 of the first safety monitoring relay 66 will always be provided to one of the input terminals 91 of that safety monitoring relay. As a result, in this circumstance, the first safety monitoring relay 66 will be precluded from providing signals on the communication links 86, 88, thereby causing the isolation system 32 to isolate the machine 48.

It should also be noted that, although FIG. 2 shows each of the communication links 24, 25, 26, 27, 56 and 58 (among others) to be only single communication links (e.g., communicating only one signal per link), in other embodiments one or more of these communication links can be understood to encompass multiple communication links including, for example, pairs of redundant communication links corresponding to the redundant communication links present in the permissive module 46b of FIG. 3B. Further, while the permissive module 46b of FIG. 3B has in particular four input ports and two output ports, in other embodiments any number of input ports or output ports could be present as appropriate given the number of input signal generating devices (e.g., RLSs and PLCs) or output signal receiving devices (e.g., isolation systems) with which the permissive module is operating. For example, it is further envisioned that some embodiments of the invention could employ permissive module(s) that interfaced multiple PLCs or other control systems.

Many of the above-described embodiments of the permissive module 46 envision that the signals received and transmitted by the permissive module (e.g., the signals provided via communication links 24, 26, 56 and 58) are simply high or low level digital signals. However, in at least some embodiments, the permissive module 46 can be configured to receive, transmit and/or process signals of more complicated types. The use of more complicated signals can improve the reliability of the overall process. For example, in at least some embodiments, in order for the PLC 42 to provide a signal to the permissive module 46 that is recognized as indicating that the PLC considers it to be acceptable for isolation to occur, a specialized signal must be provided to the permissive module by the PLC. Further for example, in one such embodiment, the permissive module 46 determines whether the PLC 42 is providing a pulse signal in which the pulses occur at a rate of less than one pulse per second. If the pulses are occurring at a rate of less than one pulse per second, then isolation is considered acceptable, while if pulses are occurring at multiple times per second, then the permissive module 46 interprets the signal as indicating that the PLC 42 does not consider it to be acceptable for isolation to occur. Many other types of signals are also possible, including signals having various duty cycles, positive or negative edge signals, analog signals, safety communication network signals or other signals.

The present invention is intended to encompass a variety of embodiments of permissive modules that interact with a variety of different types of isolation systems and other control systems, including (but not limited to) many variations of the permissive modules discussed above. For example, while the permissive module 46a of FIG. 3A includes an AND gate and an OR gate, it will be understood that modules employing other digital logic gates such as NOR gates, NAND gates and inverters could also be employed. Also many other versions of the permissive module 46b of FIG. 3B employing a variety of other types of safety relay circuits, coils, contacts, switching devices, and/or other circuit components, could be employed. In at least some embodiments (not shown in the FIGS.), the permissive module(s) can be integrated with or implemented as part of one or more isolation systems and/or other control systems rather than being distinct from such isolation systems and/or control systems as in the case of the permissive module 46 of FIG. 2. The signals to and from the permissive module (s) could also be provided via safety communication networks.

Figure 4:
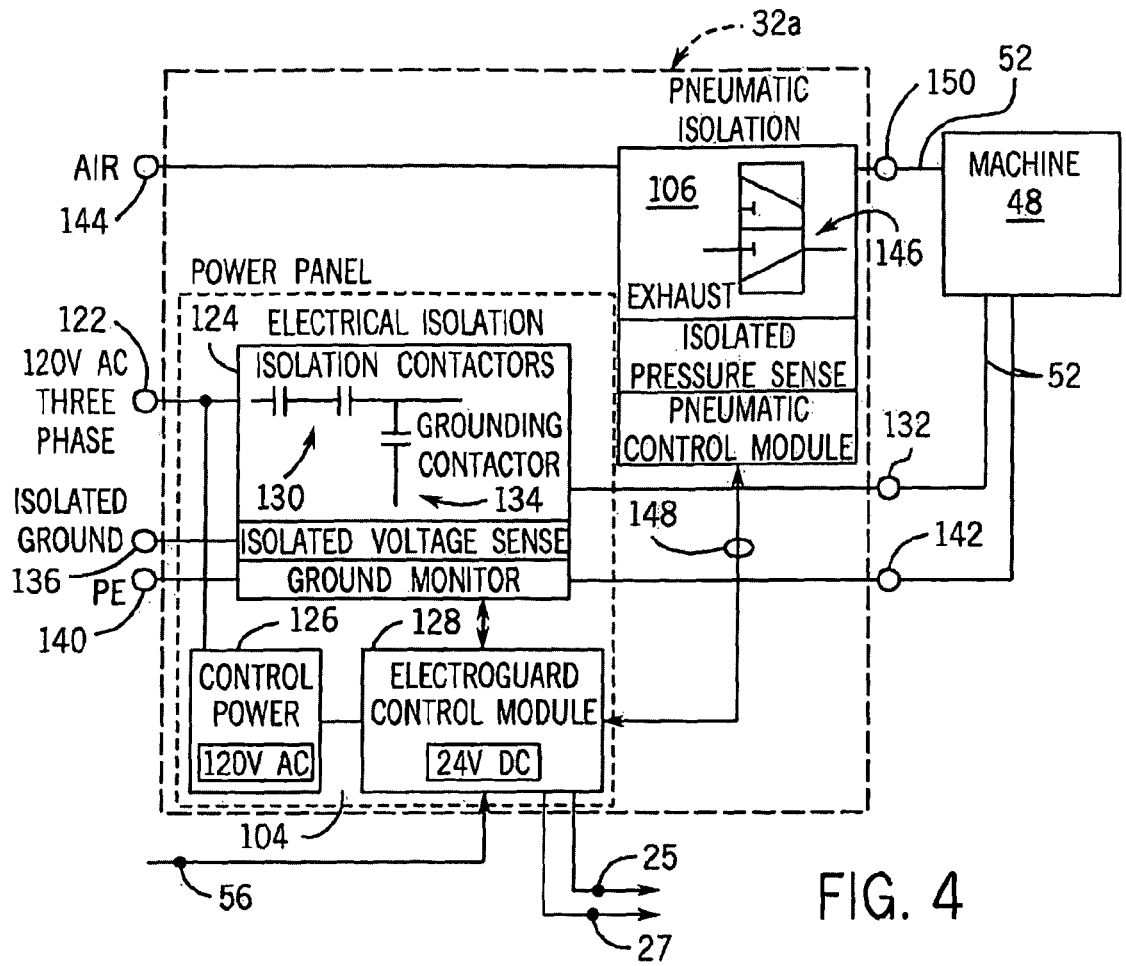
FIG. 4 shows in schematic form internal components of the isolation system of FIG. 2 in accordance with at least one embodiment of the present invention.
Figure 5:
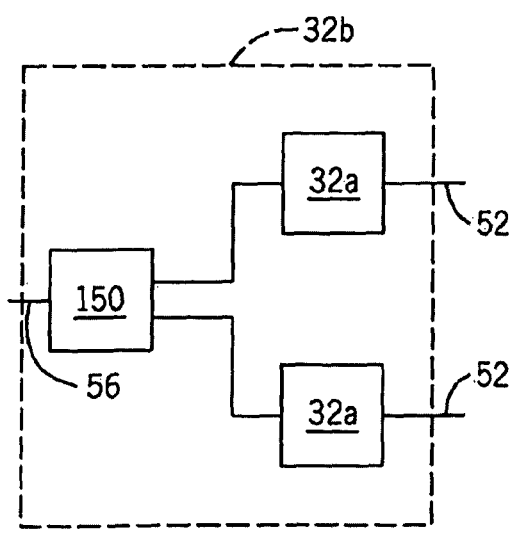
FIGS. 5 and 6 show in schematic form internal components of alternate embodiments of the isolation system of FIG. 2 differing from those shown in FIG. 4.
Figure 6:
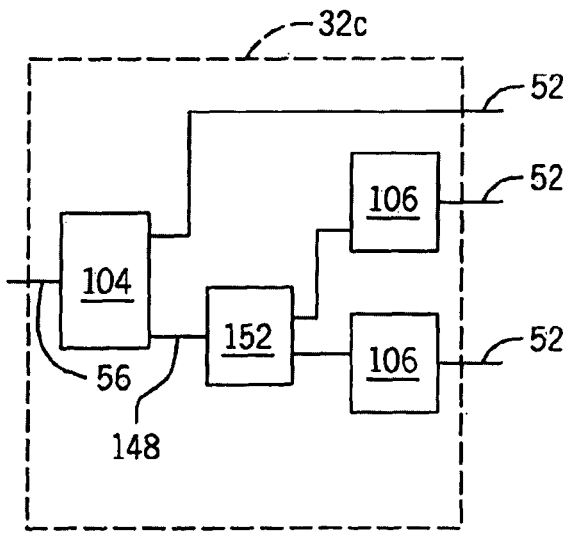

Turning to FIGS. 4-6, the isolation system 32 of FIG. 2 is intended to be representative of a variety of different forms of isolation systems. With respect to FIG. 4, for example, one embodiment of the isolation system 32, referred to as isolation system 32a, is an ElectroGuard™ Safety Isolation System as mentioned above that includes an electrical power isolation system 104 and a pneumatic power isolation system 106 (which also could be a hydraulic power isolation system or other fluidic power isolation system). For clarity, FIG. 4 also shows the machine 48 that is coupled to the isolation system 32a (the isolation of which is determined by the isolation system), albeit it will be understood that the machine 48 does not form part of the isolation system.

In the present embodiment, the electrical power isolation system 104 receives three-phase power from a three-phase power source (not shown), by way of an electrical input port 122. The power source can be of a variety of levels and types, e.g., 240V AC power, 480V AC power or DC. The three-phase power received at the electrical input port 122 is provided both to an electrical isolation module 124 of the electrical power isolation system 104 and also to a control power module 126 of the electrical power isolation system. The control power module 126 of the electrical power isolation system 104 converts the three-phase power into 120 Volt AC power, which is then provided to an internal control module 128 of the electrical power isolation system.

Further in accordance with the present embodiment, the internal control module 128 governs the operation of the electrical isolation module 124 to which it is coupled. The operation of the internal control module 128 in this regard is based upon the signal (or signals) that is provided to the internal control module (and to the isolation system 32a) from the permissive module 46 by way of the communication link 56. As discussed above, the permissive module 46 will provide a signal representative of a command to cause isolation when one or more of the RLSs 34, 36 is/are switched/triggered to an "OFF" state) and the PLC 42 provides a signal to the permissive module indicating that it is acceptable for isolation to occur.

Upon receiving a signal representative of an isolation command from the permissive module 46, the internal control module 128 causes isolation contactors 130 within the electrical isolation module 124 to open so as to disconnect the three-phase power received at the electrical input port 122 from an electrical output port 132. Since the electrical output port 132 is coupled to the machine 48 by way of one of the links 52, the machine is thereby disconnected from the three-phase power. Subsequently, a grounding contactor 134 within the electrical isolation module 124 is further actuated by the internal control module 128 so as to couple the electrical output port 132 to an isolated ground port 136 of the electrical power isolation system 104.

As further shown, the electrical power isolation system 104 includes a protective earth (PE) input terminal 140 and a PE output terminal 142. The PE input terminal 140 is coupled to a standard earth ground, and the PE output terminal 142 is coupled both to the PE input terminal 140 and in turn to the machine 48 by way of another of the links 52 such that the machine has access to the standard earth ground. The isolated ground port 136, which as discussed above is coupled to the electrical output port 132 by way of the grounding contactor 134, also is connected to the PE input terminal 140 at the main service entrance (not shown). Thus, by virtue of the operation of the isolation contactor 130 and the grounding contactor 134, the machine 48 can be entirely disconnected from the three-phase power source, grounded and electrically isolated from the three-phase power source coupled to the input port 122.

Further as shown, the pneumatic power isolation system 106 is capable of receiving pressurized air at an air input port 144. A set of one or more valves 146 within the pneumatic power isolation system 106 is controlled by way of signals provided from the internal control module 128 of the electrical power isolation system 104, to which the pneumatic power isolation system 106 is coupled by way of one or more communication links 148. When an isolation signal is received by way of the communication link 56 at the internal control module 128 indicating that an isolation command has been provided, the internal control module 128 in turn provides signal(s) to the pneumatic power isolation system 106 causing an air output port 150 of the system to be decoupled and isolated from the air input port 144, and the residual air from the machine 48 to output port 150 to be exhausted through a muffler (not shown) of the pneumatic isolation module 106. Since the machine 48 is coupled to the air output port 150 by another of the links 52, this results in pneumatic decoupling and isolation of the machine.

Thus, when an isolation signal (or signals) is provided to the internal control module 128 of the isolation system 32a from the permissive module 46 indicative of an isolation command, the machine 48 ceases to receive any electrical or pneumatic power and is isolated from the power sources coupled to the input ports 122 and 144. That is, the internal control module 128 causes the isolation system 32a to enter an isolated state such that the machine 48 is isolated from each of the different types of power (e.g., electrical, pneumatic, and/or hydraulic) that were being provided to the machine.

Additionally, when the internal control module 128 has determined that all forms of energy have been isolated (e.g., such that it is now appropriate for the operator to enter the machine), feedback is provided from the internal control module to the RLSs 34, 36 (or other triggering devices) by way of the communication links 25, 27, which in turn can precipitate other events such as the illumination of system isolated lights (e.g., such as the light 18 of FIG. 1) on the RLS(s). If the internal control module 128 determines that isolation has not occurred, the system isolated lights on the RLS(s) will not illuminate. At such time when the RLS(s) that commanded the isolation operation are appropriately switched or triggered to the "ON" state, the permissive module 46 provides a signal (or signals) to the internal control module 128 causing the electrical power isolation system 104 and the pneumatic power isolation system 106 to reestablish the connections between the electrical and pneumatic power sources and the machine 48.

The isolation system 32a of FIG. 4 is only one example of an isolation system that can be employed as the isolation system 32 of FIG. 2 or in accordance with various embodiments of the present invention. For example, in some embodiments, the machine 48 only utilizes electrical or pneumatic power (but not both) and so, in such embodiments, the isolation system need not have both an electrical power isolation system 104 and a pneumatic power isolation system 106, but instead can operate with only one such system. In some further embodiments, the internal control module 128 can be employed as part of the pneumatic power isolation system rather than as part of the electrical power isolation system.

Further referring to FIGS. 5 and 6, the isolation system 32 of FIG. 2 is also intended to be representative of combinations of isolation systems, where the operation of such multiple isolation systems is coordinated in various manners. For example, with respect to FIG. 5, another exemplary embodiment of the isolation system 32 is an isolation system 32b that includes a plurality of (in this example, two of) the isolation systems 32a of FIG. 4 that are operated in combination with one another through the use of an additional module 150 that can be termed a "multiplexer module". As shown, the multiplexer module 150 in particular receives the signal from the permissive module 46 via the communication link 56 and then provides that signal (or signal(s) based thereon) to each of the isolation systems 32a. Depending upon the embodiment, the two isolation systems 32a can be respectively responsible for governing the provision of power to the same or different machines by way of two or more links 52. It should further be noted that, although not shown in FIG. 5, at least some embodiments of the isolation system 32b will have one or more return signals corresponding to the return signals provided over the communication links 25, 27 of FIGS. 2 and 4.

As for FIG. 6, a further exemplary embodiment of the isolation system 32 is an isolation system 32c that includes an electrical power isolation system 104 such as that of FIG. 4, which is coupled to and controls more than one (in this example, two) pneumatic (or hydraulic or other fluidic) power isolation systems that in the present embodiment are each the same as the pneumatic power isolation system 106 of FIG. 4. In the present embodiment, another intermediate or "multiplexer" module 152 is coupled to the communication link 148 from the internal control module 128 of the electrical power isolation system 104 and in turn provides the signal from the internal control module (or signal(s) based thereon) to each of the pneumatic power isolation systems 106. Depending upon the embodiment, the isolation system 32c can be responsible for governing the provision of power to one or more machines by way of multiple links 52. The combination isolation systems 32b and 32c shown in FIGS. 5 and 6 are further described in U.S. patent application Ser. No. 11/240,187 filed on Sep. 30, 2005 and entitled "Combination Control System With Intermediate Module", which is hereby incorporated by reference herein.

The present invention thus is intended to encompass a wide variety of embodiments of systems that employ, in combination, one or more power delivery systems such as isolation systems (or similar systems that allow for decoupling, coupling, disconnecting, connecting, grounding, isolating or otherwise controlling a variety of sources of power), and one or more other control systems of a variety of types, where the power delivery system(s) and other control system(s) each operate in relation to a controlled machine, set of machines, or system(s), and where the one or more other control system(s) are able to influence in at least some respect the operation of the power delivery system(s) in response to various commands or requests to vary the power being supplied to the controlled machine(s) or system(s). Although particular embodiments of permissive module(s), power delivery system(s) and control system(s) are discussed above, the present invention is intended to encompass numerous variations of the particular embodiments shown.

It is specifically intended that the present invention not be limited to the embodiments and illustrations contained herein, but include modified forms of those embodiments including portions of the embodiments and combinations of elements of different embodiments as come within the scope of the following claims.

We claim:

1. A system for controlling a delivery of a first power from a power source to a load, the system comprising:
   a safety isolation system configured to receive the first power at a first input port and determine whether the first power is delivered to a first output port; and
   a first intermediate module connected with the safety isolation system, the first intermediate module being configured to receive first and second signals from an external control device and an additional control system, respectively, the first signal representing a command relating to the delivery of the first power and the second signal indicating whether a cessation of the delivery is acceptable to the additional control system;
   wherein the first intermediate module is substantially distinct from the safety isolation system and substantially distinct from the additional control system,
   wherein the intermediate module is configured to provide a first control signal and a second control signal to the safety isolation system that are configured to cause the cessation of the delivery of the first power to the first output port when the first signal from the external control device is commanding the cessation, if the second signal indicates that the cessation is acceptable to the additional control system,
   wherein the first and second control signals are redundant with respect to one another,
   wherein the intermediate module is further configured to receive a third signal from the external control device, the third signal being redundant with respect to the first signal, and
   wherein the intermediate module includes safety switching componentry that includes at least some redundant internal componentry so as to operate in a redundant manner.

2. The system of claim 1, wherein the safety isolation system includes an electrical power isolation system, the first input port is a first electrical input port, the first power is an electrical power, and the first output port is a first electrical output port.

3. The system of claim 1, wherein the safety isolation system includes a fluidic power isolation system, the first input port is a first fluidic input port, the first power is a fluidic power, and the first output port is a first fluidic output port.

4. The system of claim 3,
   wherein the safety isolation system additionally includes an electrical power isolation system, a second input port that is a first electrical input port, and a second output port that is a first electrical output port;
   wherein the electrical power isolation system is configured to receive a second power that is an electrical power at the second input port and to determine whether the second power is delivered to the second output port; and
   wherein the control signals are configured to cause the cessation of the delivery of the first power and the second power to the first output port and the second output port, respectively.

5. The system of claim 3, wherein the first power is selected from the group consisting of a hydraulic power and a pneumatic power.

6. The system of claim 1, wherein the safety isolation system includes first and second power isolation systems and a second intermediate module, wherein the second intermediate module is configured to provide at least one additional control signal to each of the first and second power isolation systems based upon the first control signal.

7. The system of claim 6, wherein the safety isolation system further includes a second input port and a second output port, wherein the safety isolation system is configured to determine whether the first power is communicated to the first output port, wherein the second power isolation system is configured to determine whether a second power received at the second input port is communicated to the second output port, and wherein the at least one additional control signal is configured to cause each of the first and second power isolation systems to prevent transfer of the respective first and second powers to the respective first and second output ports, respectively, when the at least one additional control signal is provided to the first and second power isolation systems.

8. The system of claim 1, wherein the safety isolation system includes first, second and third power isolation systems and a second intermediate module, wherein the first power isolation system is configured to determine whether the first power is delivered to the first output port, and wherein the second and third power isolation systems respectively are configured to determine whether at least one additional power is delivered to at least one additional output port.

9. The system of claim 8, wherein the first intermediate module is coupled to the safety isolation system, wherein the second intermediate module is coupled between the first power isolation system and each of the second and third power isolation systems, and wherein the second intermediate module is configured to provide additional control signals to the second and third power isolation systems at least indirectly in response to the first control signal.

10. The system of claim 9, wherein the first power isolation system is an electrical power isolation system and each of the second and third power isolation systems is a fluidic power isolation system, and wherein the additional control signals are configured to cause the second and third power isolation systems to prevent transfer of the at least one additional power to the at least one additional output port, in response to the first control signal.

11. The system of claim 1, wherein the intermediate module is configured to receive at least one additional signal, wherein each of the at least one additional signal is tube provided from a respective additional external control device.

12. The system of claim 11, wherein each of the external control devices is a respective remote lockout switch (RLS).

13. The system of claim 11, wherein each of the external control devices is selected from the group consisting of an operator-triggerable device, a switching device, a computer, and another control device.

14. The system of claim 11, wherein the intermediate module is configured to provide the first control signal to the safety isolation system so as to cause the cessation of the delivery of the first power when at least one of the first and additional signals is commanding the cessation, if the second signal indicates that the isolation is acceptable.

15. The system of claim 1, wherein the second signal indicates that the isolation of the load is acceptable to the additional control system if the second signal is a pulsed signal having a pulsing frequency above or below a threshold.

16. The system of claim 1, further comprising the external control device.

17. The system of claim 16, further comprising the additional control system, wherein the additional control system that is configured to provide the second signal is at least one of a programmable logic controller (PLC) and a safety PLC, and wherein the additional control system is configured to at least one of monitor and control the load.

18. The system of claim 16, further comprising at least one additional external control device, wherein the external control devices include a plurality of operator-actuatable switching devices, wherein a first of the operator-actuatable switching devices is configured to generate the first signal and each of the other operator-actuatable switching devices is configured to generate a respective additional signal that is to be communicated to the first intermediate module.

19. The control system of claim 18, wherein the system is further configured to operate so that each respective additional signal and the first signal are also provided at least indirectly to the additional control system.

20. The control system of claim 18, wherein at least one of the first intermediate module and the safety isolation system is configured to provide a plurality of feedback signals to the plurality of operator-actuatable switching devices.

21. An apparatus for restricting operation of a power delivery system, the apparatus comprising:
a first input terminal configured to receive a first command signal from an external control device;
a second input terminal configured to receive an additional signal from an additional control system;
a third input terminal configured to receive a second command signal;
an output terminal configured to provide a control signal to be provided to the power delivery system; and
a circuit that is configured to generate the control signal based at least indirectly upon the first command, second command, and additional signals,
wherein the apparatus is substantially distinct from the additional control system and substantially distinct from the power delivery system,
wherein the control signal is configured to cause the power delivery system to not deliver at least one type of power when the first command signal indicates a command to do so, if the additional signal indicates an acceptability status, and
wherein the circuit includes a first circuit portion having the first and third input terminals which respectively are configured to receive the first and second command signals, the first circuit portion being further configured to perform an OR-type function upon the first and second command signals so as to generate an output signal, and
wherein the circuit further includes a second circuit portion that is configured to receive both the output signal from the first circuit portion and the additional signal, the second circuit portion being further configured to perform an AND-type function upon the output signal and the additional signal so as to output the control signal at the output terminal.

22. The apparatus of claim 21, wherein the circuit includes means for processing in a redundant manner.

23. The apparatus of claim 21, wherein the circuit includes at least one of: a safety relay circuit, a coil, a contact, an OR gate; an AND gate; a NOR gate; a NAND gate; and an inverter.

24. The apparatus of claim 21, wherein the circuit includes an OR gate that is the first circuit portion having the first and third input terminals which are respectively configured to receive the first and second command signals and an AND gate that is the second circuit portion and is configured to receive both the output signal from the OR gate and the additional signal, so that the control signal can be output from the AND gate at the output terminal.

25. The apparatus of claim 21, wherein the circuit includes a first safety relay circuit coupled to the second input terminal, a second safety relay circuit coupled to each of the first and third input terminals and to the output terminal, at least one coil configured to be actuated by the first safety relay circuit, and at least one contact configured to be actuated by the at least one coil and coupled at least indirectly with the second safety relay circuit.

26. The apparatus of claim 25 wherein the first safety relay circuit is configured to at least one of energize and deenergize the first coil upon receipt of the additional signal the acceptability status at the second input terminal, so as to result in at least one of an opening and a closing of the contact, and consequently so as to result further in the second safety relay circuit causing the outputting of the control signal when the second safety relay circuit detects that at least one of the first and second command signals indicates the command.

27. The apparatus of claim 21, wherein the circuit is configured to recognize that the additional signal indicates the acceptability status when the additional signal is a pulsed signal having a frequency of greater than or lesser than a threshold.

28. A system for controlling a delivery of first power from a first power source to a first load and second power from a second power source to a second load, the system comprising:
a first power delivery system configured to receive the first power at a first input port and determine whether the first power is delivered to a first output port;
a second power delivery system configured to receive the second power at a second input port and determine whether the second power is delivered to a second output port;
a multiplexer module that is coupled to each of the first and second power delivery systems and that is configured to provide first and second control signals to the first and second power delivery systems, respectively; and
a first intermediate module connected with the multiplexer module, the first intermediate module being configured to receive first and second signals from an external control device and an additional control system, respectively, the first signal representing an external command relating to power delivery and the second signal indicating whether a cessation of power delivery is acceptable to the additional control system,
wherein the intermediate module is configured to provide an additional control signal to the multiplexer module, the multiplexer module being configured to provide the first and second control signals in response to the additional control signal, and
wherein the additional control signal is representative of both the external command relating to power delivery and the cessation of power delivery being acceptable to the additional control system.

29. The system of claim 28, wherein each of the first and second power delivery systems is a respective safety isolation system.

30. The system of claim 29, wherein each of the first and second power delivery systems is configured to govern provision of electrical power.

31. The system of claim 29, wherein the first power delivery system is configured to operate so as to couple the first output port to ground after disconnecting the first power from the first output port, and wherein the second power delivery system is configured to operate so as to couple the second output port to ground after disconnecting the second power from the second output port.

32. The system of claim 28, wherein each of the first and second power delivery systems is configured to govern provision of pneumatic or hydraulic power.

33. The system of claim 28, further comprising the external control device.

34. The system of claim 33, wherein the first intermediate module is further configured to receive an additional command signal from an additional external control device, wherein the first intermediate module includes an OR gate with input terminals which respectively are configured to receive the respective command signals from the respective external control devices and to generate an intermediate output signal, and wherein the first intermediate module further includes an AND gate that is configured to receive both the intermediate output signal and the additional signal, and that is configured to output the additional control signal.

35. The system of claim 1, wherein the safety isolation system is configured to couple the first output port to ground after disconnecting the first power from the first output port.

36. The system of claim 35, wherein the first intermediate module is further configured to receive a fourth signal from an additional external control device.
wherein the intermediate module includes a first circuit portion that is configured to perform an OR-type function upon the first and fourth signals so as to generate an output signal, and
wherein the intermediate module includes a second circuit portion that is configured to perform an AND-type function upon the output signal and the second signal upon receiving both the output signal from the first circuit portion and the second signal, so as to output the first and second control signals.

37. A system for controlling a delivery of a first power from a power source to a load, the system comprising:
a safety isolation system configured to receive the first power at a first input port and determine whether the first power is delivered to a first output port;
an external control device;
an additional control system; and
a first intermediate module connected with the safety isolation system, the first intermediate module being configured to receive first and second signals from the external control device and the additional control system, respectively, the first signal representing a command relating to the delivery of the first power and the second signal indicating whether a cessation of the delivery is acceptable to the additional control system;
wherein the first intermediate module is substantially distinct from the safety isolation system and substantially distinct from the additional control system,
wherein the intermediate module is configured to provide a first control signal and a second control signal to the safety isolation system that are redundant with respect to one another and are configured to cause the cessation of the delivery of the first power to the first output port when the first signal from the external control device is commanding the cessation, if the second signal indicates that the cessation is acceptable to the additional control system,
wherein the intermediate module is further configured to receive a third signal from the external control device that is redundant with respect to the first signal, wherein the intermediate module includes safety switching componentry that is configured to operate in a redundant manner, and wherein the additional control system that is configured to provide the second signal is at least one of a programmable logic controller (PLC) and a safety PLC, and wherein the additional control system is configured to at least one of monitor and control the load.

38. A system for controlling a delivery of a first power from a power source to a load, the system comprising:

a safety isolation system configured to receive the first power at a first input port and determine whether the first power is delivered to a first output port; and a first intermediate module connected with the safety isolation system, the first intermediate module being configured to receive first and second signals from an external control device and an additional control system, respectively, the first signal representing a command relating to the delivery of the first power and the second signal indicating whether a cessation of the delivery is acceptable to the additional control system;

wherein the intermediate module is configured to provide a first control signal and a second control signal to the safety isolation system that are redundant with respect to one another and are configured to cause the cessation of the delivery of the first power to the first output port when the first signal from the external control device is commanding the cessation, if the second signal indicates that the cessation is acceptable to the additional control system, wherein the first intermediate module is substantially distinct from the safety isolation system and substantially distinct from the additional control system, wherein the intermediate module is further configured to receive a third signal from the external control device that is redundant with respect to the first signal, and to receive a fourth signal from the additional control system that is redundant with respect to the second signal, and wherein the intermediate module includes safety switching componentry that is configured to operate in a redundant manner, the safety switching componentry including safety relay monitoring circuitry.

39. The system of claim 38, wherein the safety relay circuitry includes first and second safety relays.

40. The system of claim 39, wherein each of the first and second safety relays is configured to operate in the redundant manner.

41. The system of claim 1, wherein the redundant internal componentry includes one or more of redundant contacts, redundant coils, and other redundant internal componentry of one or more safety relay circuits.

42. A system for influencing a delivery of a first power from a power source to a load by way of a safety isolation system, the safety isolation system being configured to receive the first power at a first input port and determine whether the first power is delivered to a first output port, the system comprising:

a first intermediate module configured to be connected with the safety isolation system, the first intermediate module being further configured to receive first and second signals from an external control device and an additional control system, respectively, the first signal representing a command relating to the delivery of the first power and the second signal indicating whether a cessation of the delivery is acceptable to the additional control system;

wherein the first intermediate module is substantially distinct from the safety isolation system and substantially distinct from the additional control system, wherein the intermediate module is configured to provide a first control signal and a second control signal to the safety isolation system that arc configured to cause the cessation of the delivery of the first power to the first output port when the first signal from the external control device is commanding the cessation, if the second signal indicates that the cessation is acceptable to the additional control system, wherein the first and second control signals are redundant with respect to one another, wherein the intermediate module is further configured to receive a third signal from the external control device, the third signal being redundant with respect to the first signal, and wherein the intermediate module includes safety switching componentry that includes at least some redundant internal componentry so as to operate in a redundant manner.

* * * * *

UNITED STATES PATENT AND TRADEMARK OFFICE
CERTIFICATE OF CORRECTION

| | |
|---|---|
| PATENT NO. | : 7,868,487 B2 |
| APPLICATION NO. | : 11/405910 |
| DATED | : January 11, 2011 |
| INVENTOR(S) | : Michael Scharnick et al. |

It is certified that error appears in the above-identified patent and that said Letters Patent is hereby corrected as shown below:

Column 15, line 49: Delete "tube" and insert -- to be --.

Signed and Sealed this
Twenty-ninth Day of March, 2011

David J. Kappos
*Director of the United States Patent and Trademark Office*